Sept. 8, 1970    B. D. WILDE ET AL    3,527,304
MACHINE FOR HARVESTING VINE CROPS
Filed Nov. 25, 1966    3 Sheets-Sheet 1
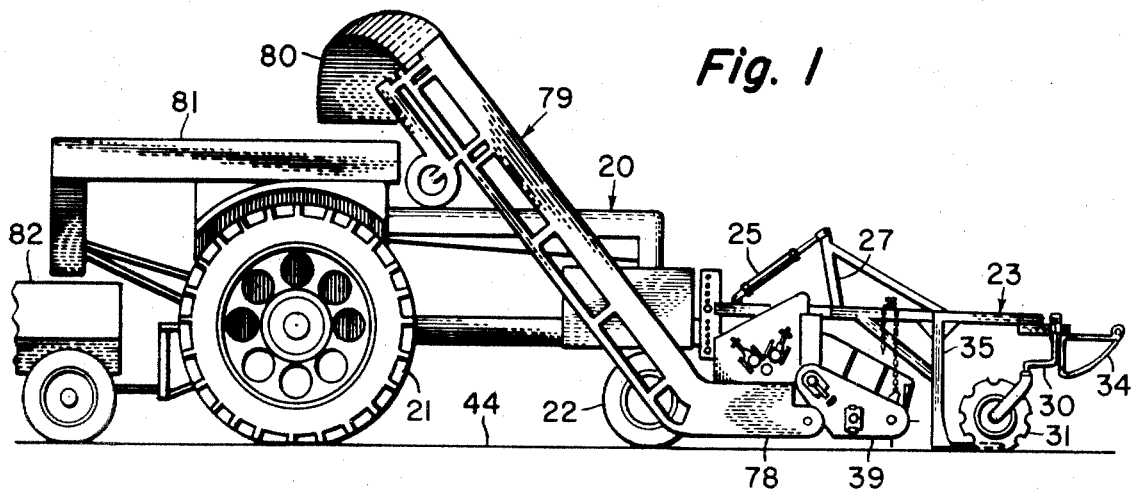
Fig. 1
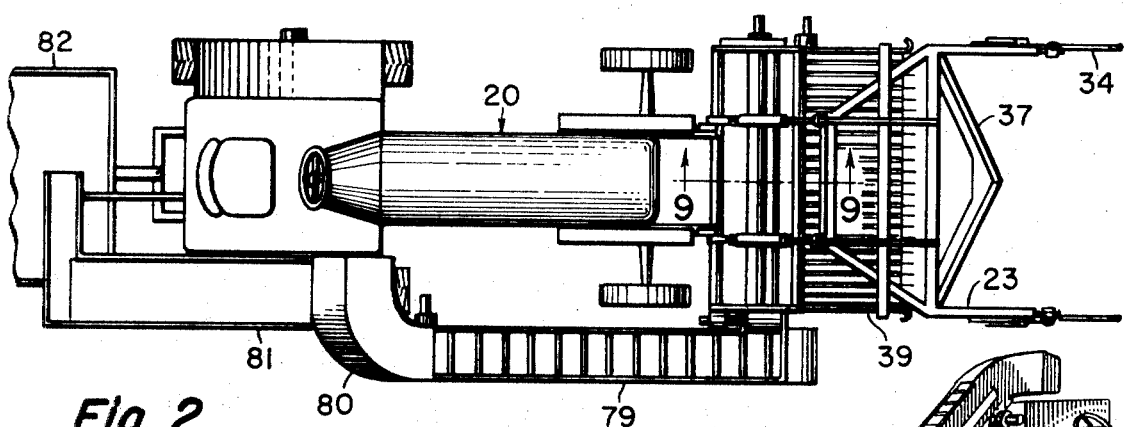
Fig. 2
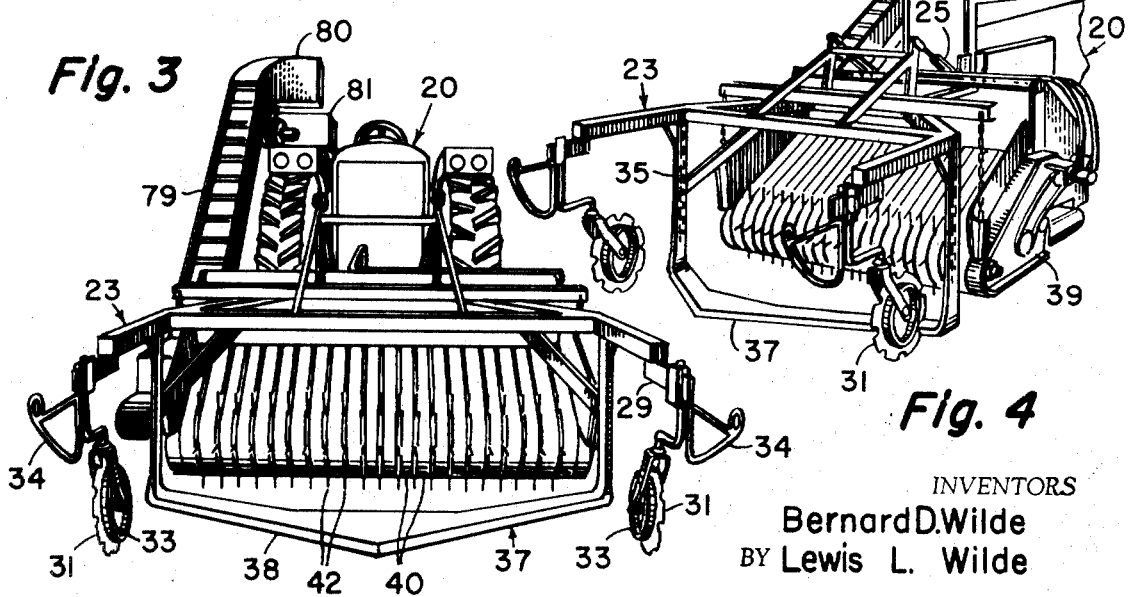
Fig. 3
Fig. 4
INVENTORS
Bernard D. Wilde
BY Lewis L. Wilde
ATTORNEY

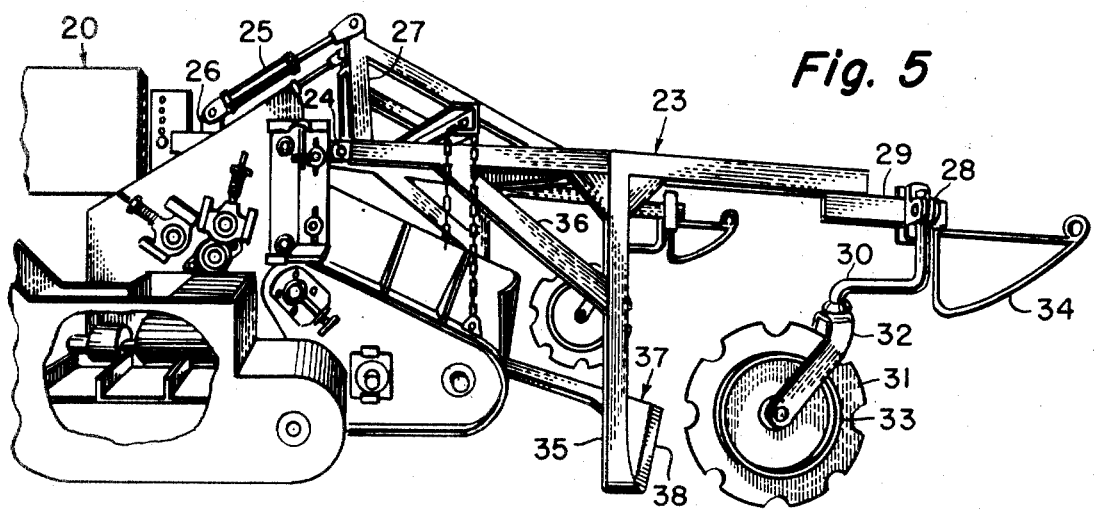
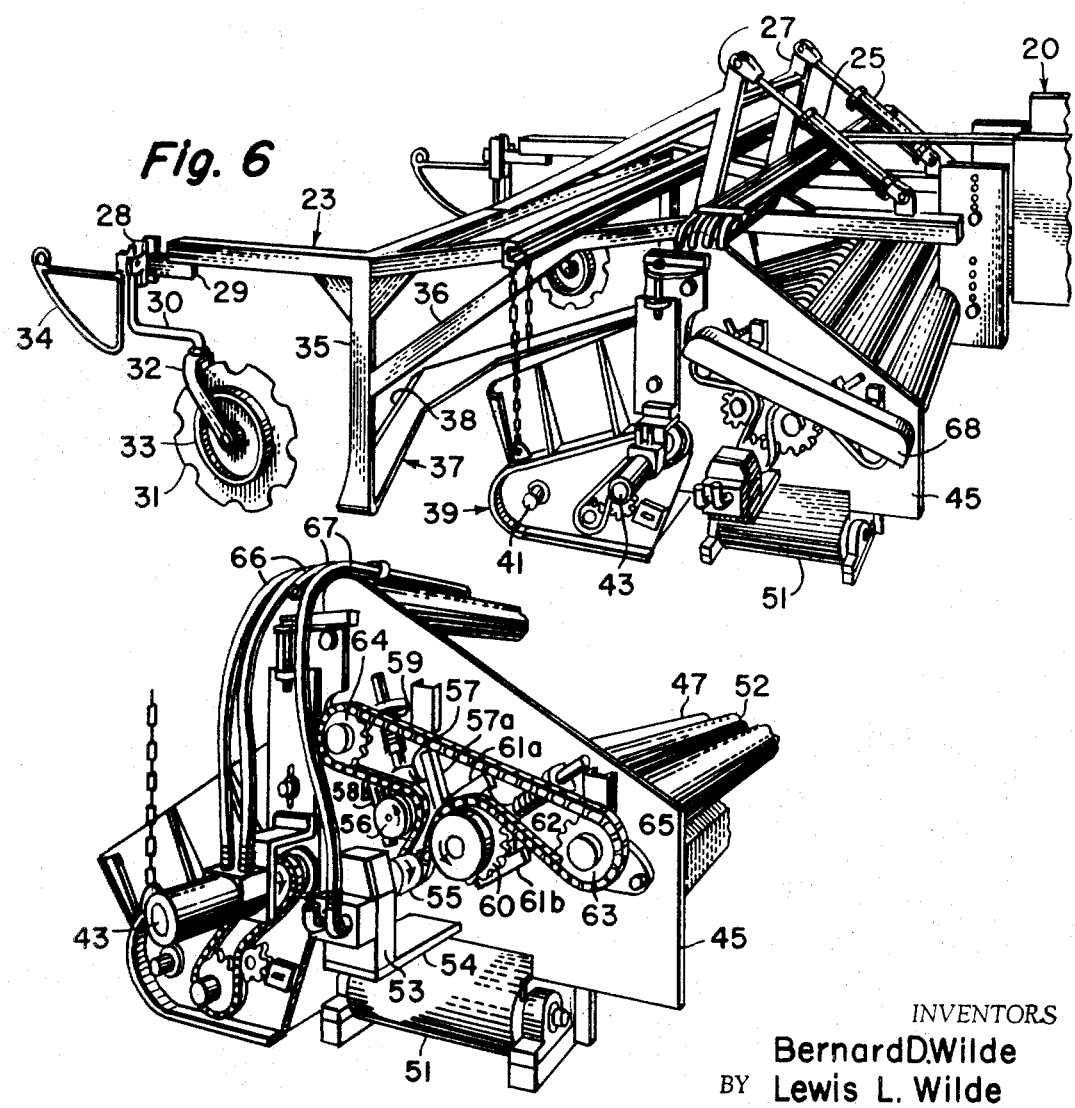

Sept. 8, 1970   B. D. WILDE ET AL   3,527,304
MACHINE FOR HARVESTING VINE CROPS

Filed Nov. 25, 1966   3 Sheets-Sheet 3

INVENTORS
Bernard D. Wilde
BY Lewis L. Wilde

ATTORNEY

United States Patent Office 3,527,304
Patented Sept. 8, 1970

3,527,304
MACHINE FOR HARVESTING VINE CROPS
Bernard D. Wilde and Lewis L. Wilde, Bailey, Mich.,
assignors to Wilde Manufacturing, Inc., Bailey, Mich.
Filed Nov. 25, 1966, Ser. No. 596,912
Int. Cl. A01d 27/04
U.S. Cl. 171—28
2 Claims

ABSTRACT OF THE DISCLOSURE

A machine for harvesting vine crops has picking rollers to strip the fruit from the vine. The vines are prepared for elevation and conveyance to the picking station by a root-severing unit which is positioned vertically by ground level independently of the remainder of the machine. The severing knife is disposed at a position in advance of the vine-elevating conveyor system, permitting an extensive slant of the cutting edge of the blade with respect to the direction of movement. Independent positioning of the knife prevents variations in depth and attitude resulting from a pitching action of the principal machine.

---

This invention relates to the construction of machines that harvest vine crops by removing the vines from the ground, and then strip off the crop. The stripped vines are normally discharged onto the ground as the machine proceeds. The preferred form of the invention has been developed to harvest cucumbers of a strain that has been adapted for single picking. These machines can also be used at the end of an extended picking period on the varieties of cucumber vines that are manually picked frequently during the period. Single picking, in either case, will produce a random assortment of sizes, the most valuable of which are the small ones used for making pickles. The cucumbers of two or three inches in length are of premium value.

The most persistent problems that have been encountered in the development of this type of machine have been (a) the removal of small cucumbers from the vine without damage, and (b) the prevention of fouling of the vines in the components of the machine. After much experimenting, applicants have devised and developed a machine of relatively low cost which collects a greater percentage of the crop present on the vine than is characteristic of other machines, and which will operate for extended periods without objectionable fouling.

The superior performance of this machine appears to be due to the manner in which the vines are freed from the soil and delivered gently to the picking rollers. These rollers pull the vines through in the manner of a laundry wringer, pinching off the crop elements as the vines move through. This type of picking operation is conventional, but the effectiveness of it is influenced by the manner of delivery of the vines to the rollers, and also by the roller diameter and arrangement. Auxiliary means are provided in the preferred form of the invention to assist the picking by pulling on the vines after they have passed through the pinch-off rollers. The delivery of the vines to the rollers includes a sequence of steps beginning with the severance of the roots, accompanied by a quick disturbance of the soil to free the vines. A forking action then approaches or dips into the disturbed loose soil, and lifts the vines upward and onto an elevating conveyor for delivery to the picking mechanism. The lifting of the vines is held to a minimum. Prepared in this manner, the vines move easily through the machine with very little tendency to foul. The several features of the invention will be analyzed in detail through the discussion of the particular embodiments illustrated in the accompanying drawings.

Figure 8:
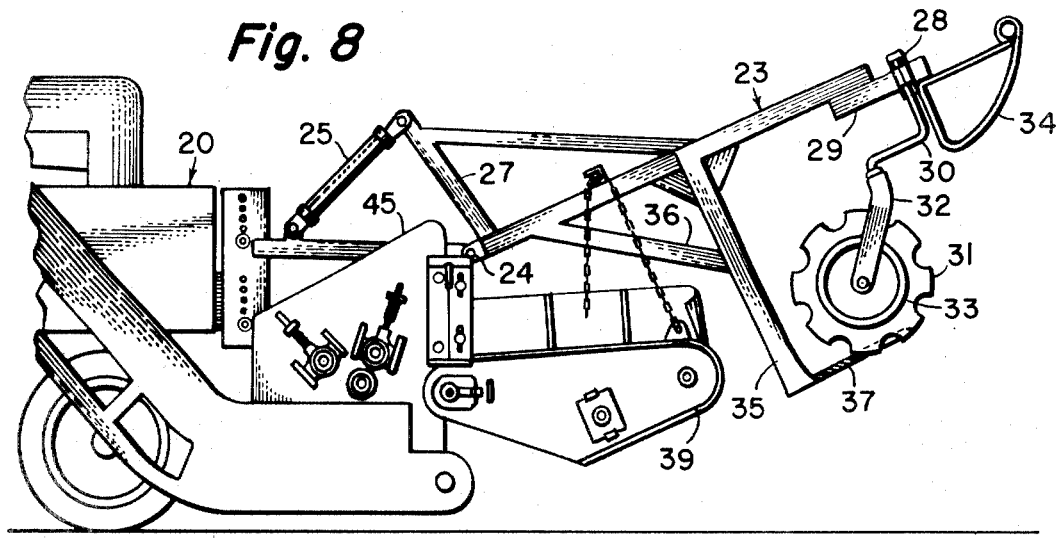
Figures 9, 10:
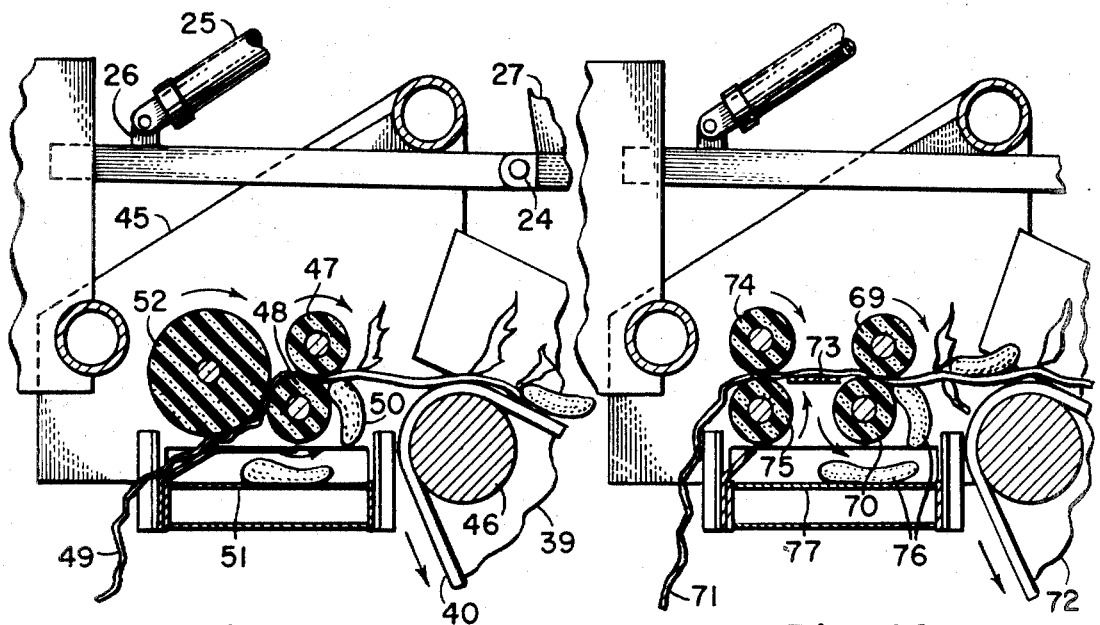

In the drawings:
FIG. 1 is a side elevation of a complete machine embodying the present invention.
FIG. 2 is a top view of the machine illustrated in FIG. 1.
FIG. 3 is a front perspective elevation of the machine illustrated in FIGS. 1 and 2.
FIG. 4 is a front-quarter perspective of the machine shown in FIG. 3.
FIG. 5 is a front elevation of the vine-processing portion of the machine.
FIG. 6 is a rear-quarter perspective of the portion of the machine shown in FIG. 5.
FIG. 7 is an enlarged view of a portion of the mechanism shown in FIG. 6, with a cover removed to expose the components.
FIG. 8 is a side elevation of the machine shown in FIG. 5, with the vine-processing equipment elevated to facilitate movement of the machine to and from picking operations.
FIG. 9 is a sectional elevation through the picking rollers in one modification of the machine.
FIG. 10 is a sectional elevation through the picking rollers of a modified form of the invention.

The preferred form of the machine illustrated in the drawings incorporates a relatively standard tractor-like vehicle 20 having its own source of power, and also provided with the usual ground-engaging wheels as shown at 21 and 22 for support. The structure of the vehicle 20 also functions as a portion of the main frame of the machine components which incorporate the present invention. An auxiliary frame 23 is pivotally connected to the main framework at 24, and the auxiliary frame may be lifted to the inactive position shown in FIG. 8 by the action of the hydraulic cylinders 25 extending from the bracket 26 on the main frame to the arms 27 on the auxiliary frame.

A bracket structure 28 is mounted on the forward extension 29 of the auxiliary frame 23 at the opposite sides of the machine for securing the offset arm 30. The bracket 28 is preferably provided with a clamping arrangement so that the arm 30 may be vertically adjustable. The knife wheel 31 is mounted in castering relationship in the fork 32 which pivots on a vertical axis at the rear extremity of the offset arm 30. The knife 31 has an annular flange as shown at 33 extending laterally from both sides of the central cutting wheel disc to limit the penetration of the knife below ground surface. The flange 33 will normally be supported by the ground, and thus determine the vertical position of the forward portion of the auxiliary frame 23. The deflector device 34 is preferably incorporated in the structure to deflect foliage down into the path of the knife 31. This same structure is provided on the opposite sides of the auxiliary frame.

Vertical legs 35 are stiffened by the diagonals 36 to provide support for the opposite side extremities of the V-shaped knife blade 37. The relative vertical position of the flanges 33 and the blade 37 are such as to cause the blade to move through the soil a few inches under the ground surface when the machine is operating in the fields. The top and bottom surfaces of the bar 37 are preferably horizontal, with the cutting edge 38 formed at the lower front portion. A beveled surface leads upwardly and to the rear from the cutting edge 38, resulting in a quick vertical displacement of the soil as the blade 37 moves through it. This sudden lifting is followed by an equally sudden drop as the trailing edge of the blade passes. This shaking action tends to free the lower vine structure from the soil, and facilitate the pull-out of the vines from the soil after they have been severed from the lower root structure.

The placement of the cutting bar 37 is well in advance of the vine-elevating device generally indicated at 39. This device, as such, is standard, and is significant only in combination with the other components of the machine. Essentially, it includes a series of closely spaced belts 40 mounted on suitable pulley means carried by a shaft supported in the bearings 41 so that the lower course of the belts 40 is adjacent ground level. In the conventional form of the vine-elevating device 39, the pulley means supporting the various belts 40 are provided with radially extending spikes disposed between the belts 40, as shown at 42. Being mounted on the belt pulleys, these spikes will extend beyond the peripheral surface defined by the belts only at the lower front of the vine-elevating device, and the spikes will retract from the top surface of the belts as the pulleys rotate. This action produces the effect of applying a lifting fork continuously to the vines on the loose ground disturbed by the cutting bar 37 as the machine proceeds. The vertical position of the vine-elevating device 39 is set so that the spikes 42 are either close to or actually engage the loose soil. Power to the vine-elevating device is preferably supplied through the use of hydraulic power-take-off systems of conventional design, resulting in the delivering of hydraulic fluid under pressure to the fluid motor 43. The speed of rotation of the motor is selected to produce a rearward movement of the top course of the belts 42 which is equal to or slightly greater than the forward movement of the machine over the ground surface 44.

Vines moving upward and to the rear through the action of the elevating device 39 are delivered to the picking mechanism supported by the side plates 45. This mechanism is essentially a group of rollers arranged as best shown in FIG. 9. The turn of the belts 40 at the upper rear extremity of the device 39 is defined by the pulleys 46, and the picking rollers 47 and 48 are preferably mounted immediately to the rear of the point of discharge of the vines from the belts 40. The rollers 47 and 48 rotate in opposite directions so as to draw the vines between them, as shown in FIG. 9. As the vines 49 pass between the rollers 47 and 48, cucumbers suspended from the vines 49 as shown at 50 are pinched off and dropped downward on to the lateral conveyor 51. The movement of the vines between the rollers 47 and 48 is facilitated by the presence of the roller 52, which bears against the roller 48 to generate a pulling action on the vines to assist their movement through the picking station.

The mounting of the rollers on the side plates 45 is best shown in FIG. 7. The hydraulic motor 53 is mounted on the bracket 54 secured to the side plate 45, and is positioned coaxially with a shaft extension of the roller 48. The coupling 55 is preferably incorporated to provide for transfer of torque and for removability of the motor 53. The sprocket 56 is mounted on an end extension of the roller 47 received in the bearing block 57, which is slidably mounted with respect to the plate 45 in the guideways 58a and 58b for movement generally radially with respect to the axis of the roller 48. The bearing block 57 is biased toward the roller 48 by the spring 59, producing a yielding pressure between the rollers 47 and 48. The sprocket 60 is similarly mounted on an end extension of the roller 52, received in a bearing block slidably supported in the guideways 61a and 61b. A spring 62 biases the roller 52 toward the roller 48 to create pressure in a similar manner. Idler sprockets are provided as shown at 63 and 64 to position the chain 65, which transfers power from the motor 53 to the various sprockets. The bearing support of the rollers 47, 48 and 52 is similar at the opposite end of the machine, but it is not necessary to duplicate the chain drive and sprockets. Hydraulic pressure is applied to the motor 43 through conventional pressure conduits 66, and to motor 53 by the conduits 67. To protect the power transfer system shown on FIG. 7, it is preferable to incorporate a cover as shown at 68. This will also have a tendency to minimize the entrapment of foliage and other material in the moving components. It is also preferable that the control of the fluid pressure delivered through the conduits 67 to the motor 53 (providing power for the picking rollers) have a conventional valve arrangement which permits the speed of rotation of the motor 53 to be varied and reversed at will. Occasionally, it may become necessary to reverse the rotation of the picking rollers momentarily to free a mass of vines that may be out of position.

Another form of picking roller arrangement is shown in FIG. 10. The mounting of the rollers in this view, and the delivery of power to them, may be similar in principle to that shown in FIG. 7. In the FIG. 10 modification, the picking rollers 69 and 70 receive the vines 71 in the same manner and generally in the same position, as the rollers 47 and 48. The vine-elevating device generally indicated at 72 is preferably the same as the device indicated at 39. The vines leaving the picking rollers 69 and 70 proceed over a shelf structure 73, which is optional, to the secondary pair of rollers 74 and 75, which function primarily to pull the vines through the rollers 69 and 70. Preferably, the peripheral velocity of the rollers 74 and 75 is slightly in excess of that of the rollers 69 and 70 to maintain the pulling action, which facilitates the stripping of the crop elements 76 from the vines. These fall down onto the lateral conveyor 77 adjacent ground level for movement to the side of the vehicle 20, where they are deposited on the horizontal section 78 of the delivery conveyor 79. The latter delivers the crop elements to the chute 80, which may transmit the crop elements to a rearward conveyor 81 for deposit in the accumulating trailer 82. The structural details of the elevating conveyor 79 are conventional, although the horizontal section 78 may provide a preliminary sorting function as well as that of a conveyor.

The ability of the machine to remove all of the various sizes of crop elements from the vines is influenced by the diameter of the picking rollers 47–48 and 69–70. A roller diameter that is excessively large will produce a constricting area in which the surfaces are moving together at such a small angle as will tend to draw the crop elements themselves in between the rollers. Conversely, a very small roller diameter will minimize the damage to the crop, but will correspondingly produce a smaller area of convergent surfaces for drawing the vines through the picking station. Applicants have found that the most desirable compromise between these considerations is a roller diameter of around three to four inches. The diameter of the pulling roller 52 is determined by different considerations, and has been found to be preferably around 6½ inches. While the peripheral speed of the rollers is preferably selectively variable, it is normally necessary to maintain this peripheral velocity of the picking rollers such that it is in excess of velocity of forward movement of the machine through the field. This, combined with the pulling action of the elevating conveyor 39, will tend to maintain a continuous motion of the vines so that they are generally pulled from the ground through the picking operation without severe bunching.

The maintaining of a smooth flow of the vines through the machine is facilitated by keeping the necessary vine elevation to a minimum. Placement of the cutting system ahead of the lifting device permits the picking and lateral conveying equipment to be placed immediately behind the vine elevating device. The required height of elevation is established by the picking and conveying structure, which is kept down as low as possible, with a minimum ground clearance provided to avoid obstructions.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. An improved machine for harvesting a vine crop, said machine having a main frame provided with ground-engaging support wheels providing a normal direction of forward movement, a vine-elevating device, a picking mechanism including power driven rollers mounted on said main frame and disposed to receive vines from said vine-elevating device to pinch off crop elements between said rollers, and conveying means disposed to conduct crop elements from said rollers to a receiver, wherein the improvement comprises:
- an auxiliary frame pivotally mounted on said main frame rearwardly of the forward extremity of said vine-elevating device and extending forwardly beyond said vine-elevating device, with respect to the normal direction of movement of said machine, the forward portion of said vine-elevating device being suspended from said auxiliary frame;
- a pair of knife elements mounted at opposite sides of said auxiliary frame and ahead of said vine-elevating device for cutting on vertical front-rear planes to a predetermined depth below ground level;
- means for supporting said auxiliary frame in predetermined relationship to ground level; and
- a cutting bar mounted on said auxiliary frame and extending between the paths of said knife elements at a selected depth below ground level, said cutting bar being disposed ahead of said vine-elevating device, whereby vines are severed from the lower root growth well in advance of the vine-elevating device to facilitate free movement of the vines through the vine-elevating device and the picking rollers.

2. The improvement defined in claim 1, wherein said knife elements are castering wheel-shaped discs disposed forwardly opposite the outer extremities of said cutting bar, and said means for supporting the auxiliary frame include flanges extending axially from said discs.

References Cited

UNITED STATES PATENTS

| | | | |
|---|---|---|---|
| 3,252,520 | 5/1966 | Hilletal | 171—94 |
| 3,263,405 | 8/1966 | Rohmfeld | 56—23 |
| 2,537,198 | 1/1951 | Wetzel et al. | 171—5 |
| 2,546,786 | 3/1951 | Rowe | 171—5 |
| 2,729,049 | 1/1956 | Porter | 56—364 |
| 3,347,031 | 10/1967 | De Long et al. | 56—327 |
| 3,387,611 | 6/1968 | Looker | 171—28 |

ANTONIO F. GUIDA, Primary Examiner

U.S. Cl. X.R.

56—327